June 4, 1963  G. A. DOBSLAW  3,092,154
RADIAL SAW ADJUSTMENT MEANS
Filed March 28, 1960  3 Sheets-Sheet 1
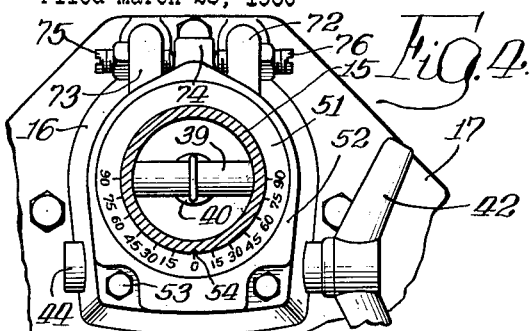
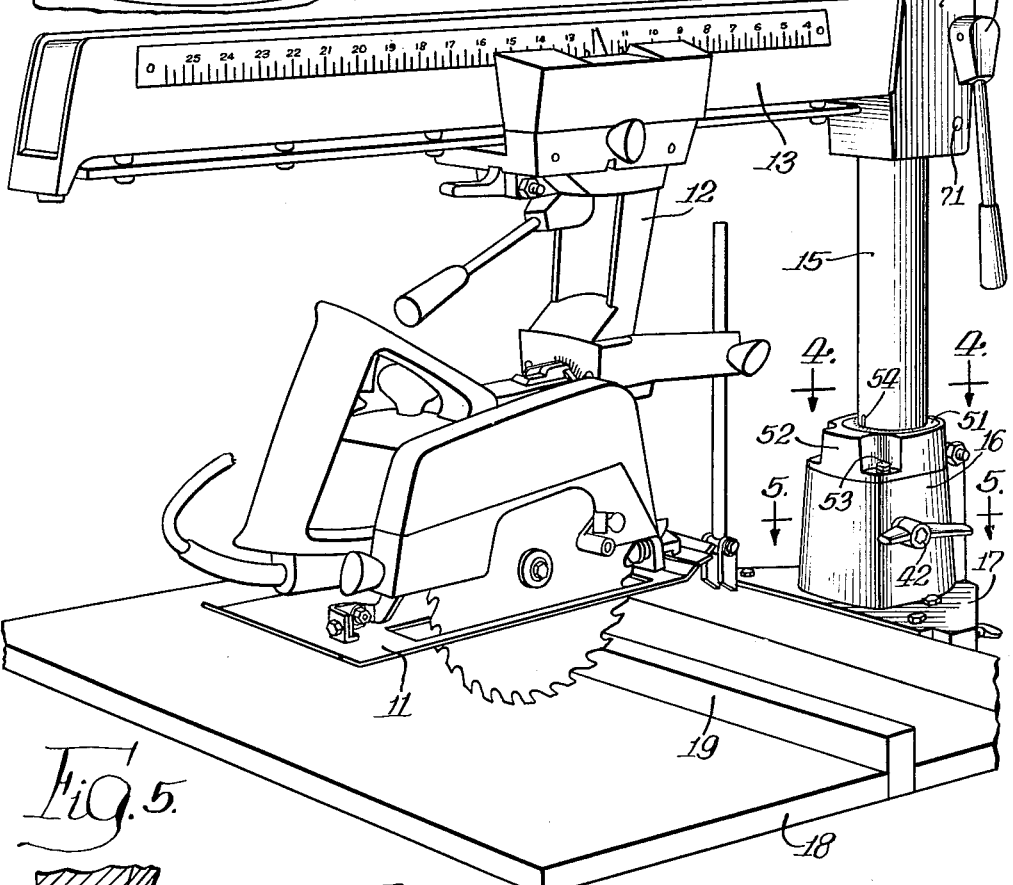
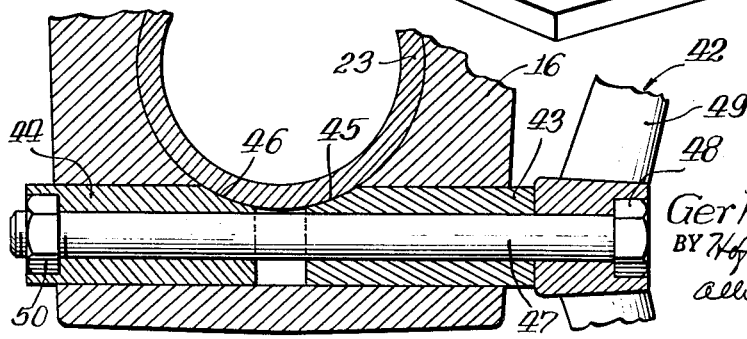
INVENTOR.
Gerhardt A. Dobslaw,
BY Hofgren, Brady, Wegner,
Allen & Stellman
Atty's June 4, 1963
G. A. DOBSLAW
3,092,154
RADIAL SAW ADJUSTMENT MEANS
Filed March 28, 1960
3 Sheets-Sheet 2
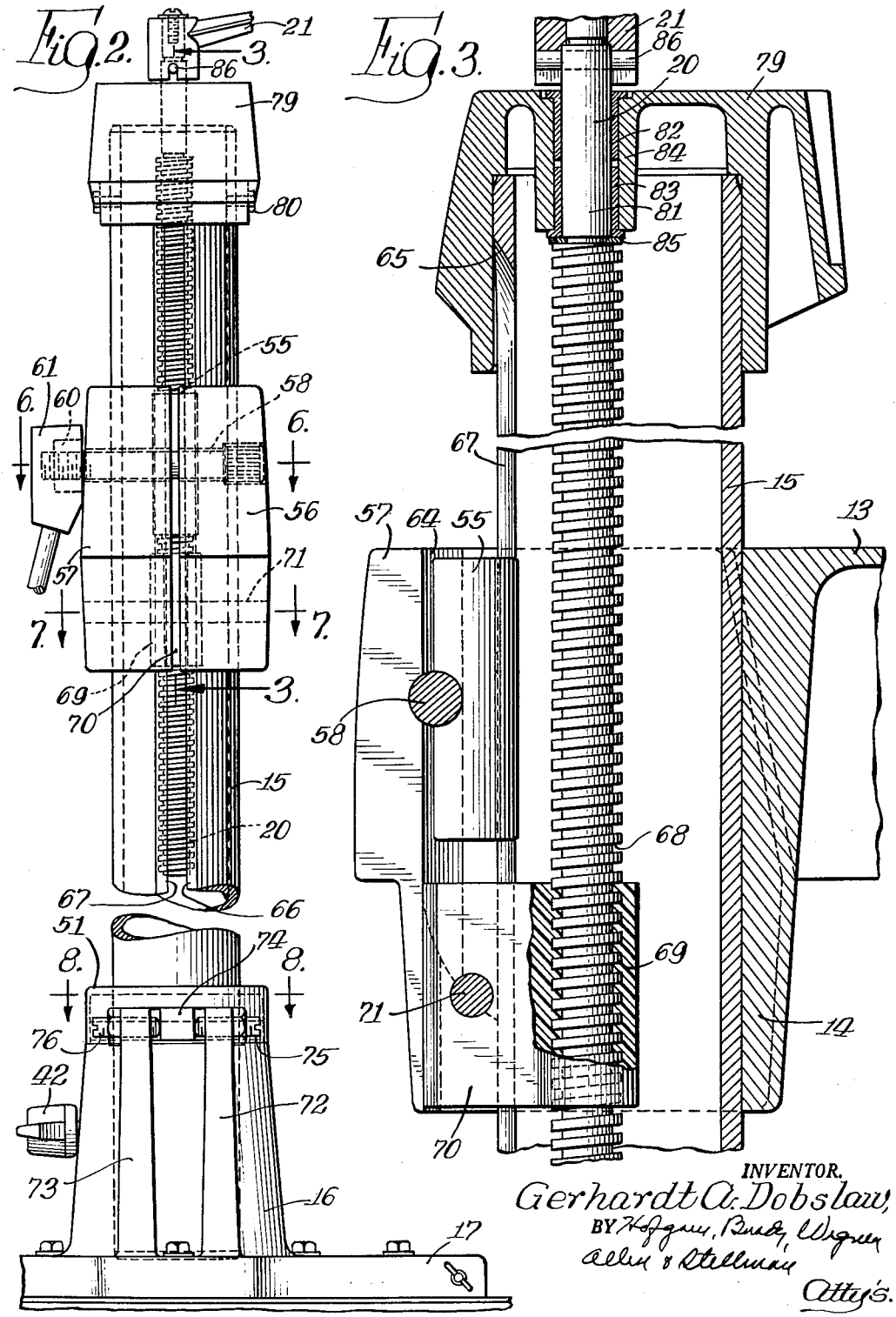
INVENTOR.
Gerhardt A. Dobslaw,
BY
ATTY'S.

June 4, 1963  G. A. DOBSLAW  3,092,154
RADIAL SAW ADJUSTMENT MEANS
Filed March 28, 1960  3 Sheets-Sheet 3

INVENTOR.
Gerhardt A. Dobslaw,
BY Hofgren, Brady, Wegner
Allen & Stellman Attys.

United States Patent Office 3,092,154
Patented June 4, 1963

3,092,154
RADIAL SAW ADJUSTMENT MEANS
Gerhardt A. Dobslaw, Park Forest, Ill., assignor to Portable Electric Tools, Inc., a corporation of Illinois
Filed Mar. 28, 1960, Ser. No. 18,185
12 Claims. (Cl. 143—6)

This invention relates to radial saws and in particular to positive alignment means for use in radial saws.

In a radial saw, a rotary saw is carried on an arm cantilevered from a column supported on a base which also carries a work table having a work guide. A very common operation with such a radial saw is the cutting of work, such as boards, at right angles to their longitudinal extents. To obtain a truly square cut of the board, it is necessary that the radial arm extend truly perpendicularly to the table guide against which the board is held during the cutting operation. Another common operation with such a radial saw is the cutting of such boards at 45° angles to their longitudinal extents and it is similarly necessary to align the radial arm accurately at an angle of 45° relative to the table guide to assure an accurate cutting of the boards at this angle. The present invention is concerned with a new and improved means for automatically positioning the radial arm accurately at such angles to the table guide while permitting ready positioning of the arm at intermediate angles when desired.

It is, thus, a principal object of the invention to provide a new and improved alignment means for use in a radial saw.

Another object is to provide such an alignment means having improved accuracy and positive action.

A further object is to provide such an alignment means which is simple and economical of construction.

Still another object is to provide such an alignment means arranged to index accurately the radial saw column relative to the base wherein the base includes means defining a pair of planar surfaces converging downwardly toward a horizontal line extending radially to the axis of the column, and the column is provided with a cylindrical element extending horizontally axially from the axis thereof to be urged by suitable means downwardly against the planar surfaces to cause the cylindrical element to center itself removably accurately therebetween.

A still further object is to provide such an alignment means wherein the planar surfaces are inclined at an angle of approximately 30° to the vertical for providing an improved facilitated release of the column when desired and a positive accurate centering of the column when desired.

Yet another object is to provide such an alignment means fixing the radial arm to the column in an accurate position circumferentially of the column.

A yet further object of the invention is to provide such an alignment means wherein the column is provided with a vertical channel defined by a pair of planar surfaces converging generally radially inwardly toward the axis of the column, the arm is provided with a pair of clamping portions engaging the column and forming a second vertical channel defined by a pair of planar surfaces converging generally radially outwardly away from the axis of the column, and a cylindrical element is disposed in the space defined by the two pairs of planar surfaces, which cylindrical element when the clamping portions of the arm are urged together forcibly engages the planar surfaces causing the cylindrical element to center itself accurately therebetween and resultingly align the arm accurately with the column channel.

Other features and advantages of the invention will be apparent from the following description taken in connection with the accompanying drawing wherein:

FIG. 1 is a fragmentary perspective of a radial saw provided with alignment means embodying the invention;

FIG. 2 is an enlarged fragmentary rear elevation thereof;

FIG. 3 is a further enlarged vertical section taken substantially along the line 3—3 of FIG. 2;

FIG. 4 (Sheet 1) is an enlarged, fragmentary horizontal section taken substantially along the line 4—4 of FIG. 1;

FIG. 5 is a further enlarged fragmentary horizontal section taken substantially along the line 5—5 of FIG. 1;

Figure 6:
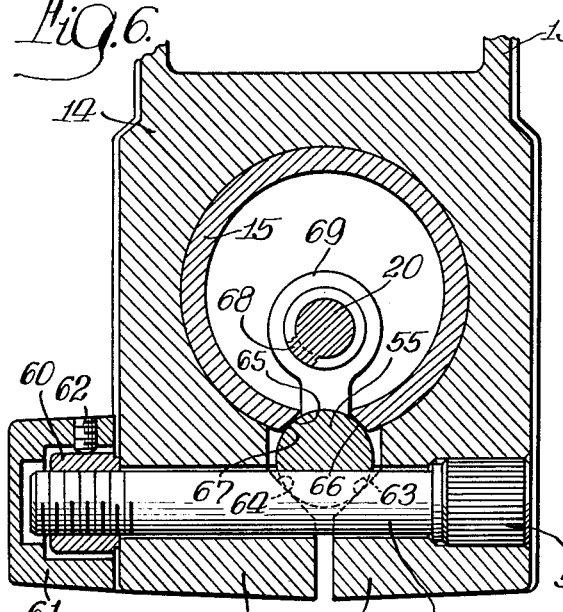
FIG. 6 (Sheet 3) is an enlarged fragmentary horizontal section taken substantially along the line 6—6 of FIG. 2.
Figure 7:
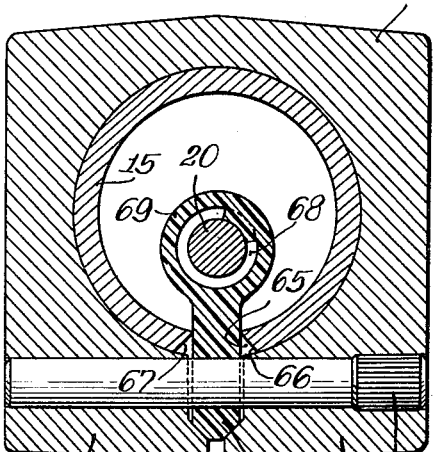
FIG. 7 is an enlarged, fragmentary horizontal section taken substantially along the line 7—7 of FIG. 2.

In the exemplary embodiment of the invention as disclosed in the drawing, a radial arm saw generally designated 10 includes a portable type saw 11 releasably secured by a suitable carriage 12 to the saw arm 13 mounted at one end 14 of the saw column 15. Column 15 is supported to extend vertically in a support 16 carried on a base 17 which also carries the saw table 18 having a conventional work guard, or fence, 19. Arm 13 is raised and lowered on column 15 by means of a screw threaded rod 20 extending longitudinally through the column and rotated by a suitable crank handle 21 at the upper end thereof. The present invention is concerned with the accurate positioning of column 15 in different rotational positions relative to its longitudinal axis and accurately related to the extension of fence 19, and the accurate alignment of arm 13 in a preselected rotational position on column 15.

Figure 9:
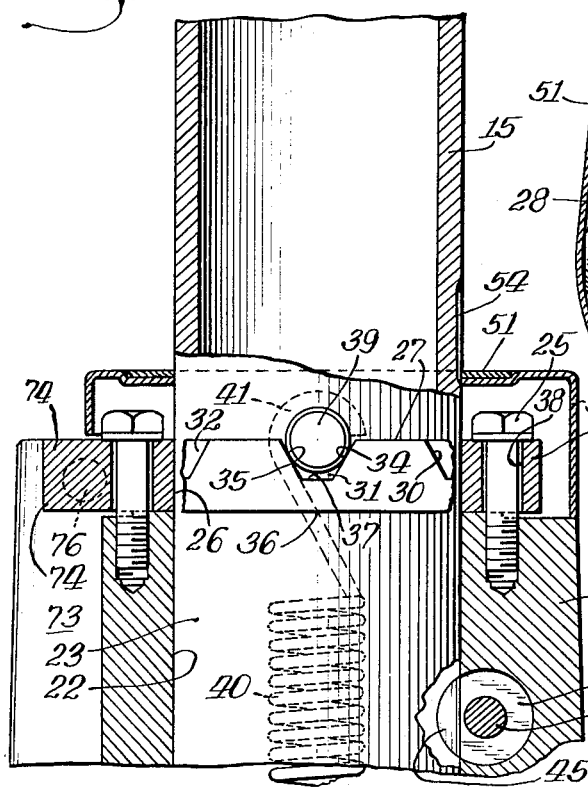
FIG. 9 is a fragmentary vertical section taken substantially along the line 9—9 of FIG. 8.
Figure 8:
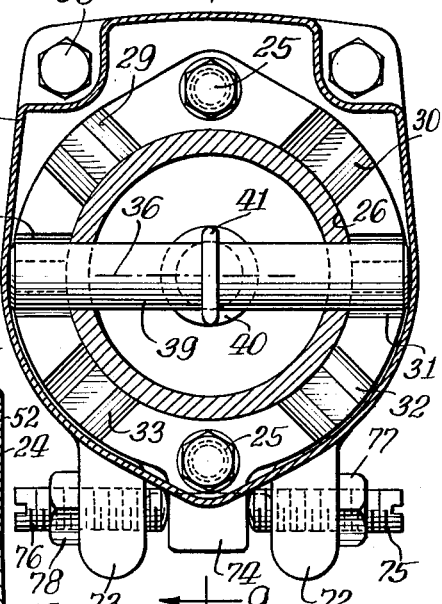
FIG. 8 is an enlarged, fragmentary horizontal section taken substantially along the line 8—8 of FIG. 2.

More specifically, support 16 comprises a heavy cast member having a central upwardly opening bore 22 (FIG. 9) accurately slidably receiving the lower end 23 of column 15. A generally annular indexing member 24 is secured to the top of support 16 by suitable means such as screws 25 and is provided with a bore 26 corresponding to support bore 22, through which the column end 23 extends. The upper surface 27 of index member 24 is provided with six upwardly opening grooves 28, 29, 30, 31, 32 and 33 (see FIG. 8). The grooves are diametrically paired and of identical configuration. More specifically, referring to groove 28 as illustrative thereof, the grooves are defined by a pair of planar surfaces 34 and 35 converging downwardly toward a horizontal radius 36 of the index member bore 26, and a horizontal bottom surface 37. Diametrically paired grooves 28 and 31 are aligned to extend parallel to the fence 19; diametrically paired grooves 29 and 32 are aligned 45° in a clockwise direction, as seen in FIG. 8, therefrom; and diametrically paired grooves 30 and 33 are aligned 45° in a counterclockwise direction therefrom. To assure an accurate alignment of the grooves as indicated, the holes 38 in index member 24 through which bolts 25 extend are made to be slightly larger than the bolts permitting a small amount of rotational adjustment of index member 24 on support 16. Thus, by providing annular indexing member 24 as a member separate from the support 16, a high degree of accuracy in the arrangement of the grooves 28 through 33 may be obtained with substantially improved facility. More specifically, the indexing member may comprise a sintered powder metal ring permitting manufacture of production quantities thereof from a single die formed with the desired accuracy. Where indexing grooves are provided directly in the support member, they must be machined therein, this method being substantially more costly and less accurate.

Rotational adjustment of the index member 24 is herein effected by an adjusting means carried by the support 16 comprising a pair of horizontally spaced flanges 72 and 73 on the rear of support 16, and a boss 74 extending radially from index member 24 perpendicularly to the radius 36 and centered between the flanges. A set screw 75 is threaded through flange 72 to engage one side of boss 74 and a similar set screw 76 is threaded through flange 73 to engage the opposite side of boss 74. By suitably advancing a selected one of the set screws while correspondingly withdrawing the other of the set screws, an accurate adjustment of the rotational position of index member 24 may be effected within the limits allowed by the oversized holes 38. A pair of nuts 77 and 78 are threaded on the set screws 75 and 76 respectively to lock the set screws in the adjusted position.

Fixed diametrically to lower end 23 of column 15 is a cylindrical rod 39 which projects radially outwardly from column 15 to rest on index member upper surface 27 selectively in the grooves and on the lands therebetween. Rod 39 is urged downwardly by a strong coil spring 40 fixed to the base 17 to extend coaxially through support 16 and including an upper hooked end 41 engaging the rod.

To index the radial arm 13 selectively in the three positions corresponding to the paired grooves, namely the position in which the arm extends perpendicularly to the vertical plane of fence 19 and the two positions 45° to either side of the perpendicular position, the column is merely rotated by swinging arm 13 to the selected position whereupon the rod 39 automatically centers the column accurately in the selected position. To assure such accurate positioning, it is preferable that the inclination of the surfaces 34 and 35 of the grooves have a relatively small angle to the vertical, herein approximately 30° plus or minus two degrees. Such an inclination of the planar surfaces further permits the rod 39 to cam itself readily out of the groove when the column is rotated away from the indexed position. The diameter of rod 39 is preferably sufficiently greater than the width of horizontal bottom surface 37 of the grooves so that when the rod is seated in the groove it remains spaced above the bottom surface 37 to assure the accurate centering of the rod between the inclined surfaces 34 and 35.

A positive retention of the column both in the indexed positions determined by the paired grooves and in positions intermediate the indexed positions is effected by a clamp 42 illustrated in FIG. 5, including a pair of clamping blocks 43 and 44 having segmentally cylindrical surfaces 45 and 46 respectively engaging the side wall of column portion 23 in support 16. The clamping blocks are urged together and against the column portion 23 by a bolt 47 extending therethrough and having its head 48 locked against rotation in a handle 49, and a co-operating nut 50 retained against rotation in the outer end of clamping block 44. A dial plate 51 is carried by a cover 52 secured to support 16 by means such as bolts 53, for co-operation with an index mark 54 to indicate the angular position of the column.

Arm 13 is fixed to column 15 to extend accurately perpendicularly to the axis of rod 39 by means of an axially vertical cylinder 55 (FIGS. 2, 3 and 6) held between a pair of rearwardly extending arms 56 and 57 of arm portion 14 which are urged forcibly together and against cylinder 55 by a stud 58 having a serrated head 59 fixed in arm 56, and a nut 60 to which is secured a handle 61 by suitable means such as set screw 62. Arm 56 is provided with a vertical planar surface 63 and arm 57 is provided with a complementary vertical planar surface 64 facing inwardly toward cylinder 55 and urging the cylinder inwardly toward the vertical axis of column 15 as the arms 56 and 57 are drawn together by screw 58 and nut 60. The rear of column 15 is provided with a vertical elongated slot 65 defined by a pair of vertical planar surfaces 66 and 67 facing outwardly toward cylinder 55 and substantially parallel to arm surfaces 64 and 63 respectively. Thus, when the arms 56 and 57 are drawn together, cylinder 55 is accurately centered between the first pair of planar surfaces 63 and 64 and the second pair of planar surfaces 66 and 67. Slot 65 is accurately arranged in column 15 to be centered on a vertical radial plane of the column accurately perpendicular to the axis of rod 39 and, thus, when cylinder 55 is so centered between the planar surfaces, radial arm 13 extends accurately perpendicular to the rod. As discussed above, index member 24 is arranged to position the rod accurately in the preselected index positions relative to the fence 19 and, thus, the radial arm 13 is automatically aligned accurately in the perpendicular and 45° angular relationships to the vertical plane of the fence 19 thereby.

The raising and lowering of arms 13 is effected as indicated above by a screw 20 which extends axially of the column 15. Screw 20 may be provided with a fast acting acme thread 68 co-operating with a complementary threaded block 69, which may be formed of a plastic material such as Zytel No. 101 nylon, and which is secured to arm portion 14 by a radial extension 70 secured between arms 56 and 57 by a pin 71. Screw 20 is supported in column 15 by a cap 79 fixed to the upper end of column 15 by suitable means such as screws 80. The upper end of screw 20 is defined by a cylindrical portion 81 journalled in a pair of bushings 82 and 83 carried in a depending annular boss 84 of cap 79. A washer 85 is disposed between lower bushing 83 and the upper end of the threaded portion 68 of the screw 20 and the upper end of the cylindrical portion 81 is secured to handle 21 by a suitable pin 86. Thus, to raise and lower the radial arm 13, the operator need merely loosen nut 60 my manipulation of handle 61 and turn crank handle 21 suitably to move block 69 in the desired direction. Upon completion of the adjustment of the height of the arm 13, handle 61 is turned to tighten nut 60 thereby automatically and accurately recentering the arm 13 relative to column 15.

Thus, to align radial arm 13 accurately perpendicular to the vertical plane of fence 19, the operator need merely swing the radial arm on column 15 to approximately the perpendicular position. Thereupon, spring 40 urges the rod 39 downwardly into the pair of grooves 28 and 31 automatically centering the rod 39 therein accurately parallel to the fence 19. Arm 13 is retained on column 15 accurately perpendicular to the vertical plane containing the axis of rod 39 by means of the cylinder 55 and co-operating surfaces 63, 64, 65 and 66 which are urged firmly against the cylinder by means of handle 61. Thus, the radial arm is automatically aligned accurately perpendicular to the vertical plane of the fence. If it is desired to position to the arm 13 at a different elevation, the handle 61 is operated to release the engagement of surfaces 63 and 64 with cylinder 55 and handle 21 is rotated in the proper direction to raise or lower the arm as desired. Handle 61 is then operated to retighten the arm holding means by urging the surfaces 63 and 64 forcibly against cylinder 55, thereby again automatically centering the arm.

If it is desired to position the arm 13 at an angle of 45° to the left or the right from the perpendicular position discussed above, the radial arm is merely swung to approximately the selected 45° position. The inclination of the index member surfaces 34 and 35 readily permits the rod 39 to cam itself upwardly thereagainst and move outwardly from the grooves 28 and 31. When the rod 39 is positioned approximately at the 45° position, the spring 40 again urges it down into the selected groove pair to center the rod accurately between the confronting planar surfaces of each groove of the selected pair, thereby accurately centering the radial arm in the selected 45° position.

When it is desired to position the radial arm in an intermediate angular position or beyond the 45° positions, the arm is merely swung to the selected angular position as determined by the co-operating dial plate 51 and index mark 54, whereupon the handle 42 is operated to force clamping blocks 45 and 46 against column end 23, firmly securing the column in the selected angular position.

While I have shown and described certain embodiments of my invention, it is to be understood that it is capable of many modifications. Changes, therefore, in the construction and arrangement may be made without departing from the spirit and scope of the invention as defined in the appended claims.

I claim:
1. In a radial saw, the combination comprising: a support member having an axis; a movable member carried on the support member for movement about said axis; means on the support member defining three pairs of planar surfaces respectively converging toward three lines extending radially from said axis and spaced 45° apart in a plane perpendicular to said axis; a cylindrical element on the movable member extending radially to said axis; and means for urging said cylindrical element against said surfaces to cause the cylindrical element to center itself removably accurately therebetween.

2. In a radial saw, the combination comprising: a support member having an axis; a movable member carried on the support member for movement about said axis; means on one of the support and movable members defining a pair a planar surfaces converging toward a line; a substantially completely cylindrical element on the other of the support and movable members having an axis, the one of said line and said cylindrical element axis which is on said support member lying in a preselected plane in which said support member axis also lies, the other of said line and said cylindrical element axis defining with said support member axis a plane which coincides accurately with said preselected plane when said cylindrical element is centered between said surfaces, said surfaces being oppositely equiangularly related to the plane including said line; and means for urging said cylindrical element and said surfaces tangentially together to cause the curved surface of the cylinder to be engaged concurrently by each of the said surfaces thereby to effect a centering of the cylindrical element removably accurately between said surfaces.

3. In a radial saw, the combination comprising: a support member having a vertical axis; a movable member carried on the support member for movement about said axis; means on the support member defining a pair of planar surfaces converging downwardly toward a horizontal line lying in a preselected plane in which said axis also lies; and a cylindrical element on the movable member having a horizontal axis extending perpendicular to said support member axis, said cylindrical element being urged downwardly against said surfaces whereby the cylindrical element centers itself removably accurately therebetween.

4. The device of claim 3 wherein said planar surfaces are inclined approximately 30° to the vertical.

5. The device of claim 3 wherein said means on the support member includes a horizontal surface intersecting said planar surfaces above said line and said cylindrical element has a diameter sufficiently greater than the width of said horizontal surface between said planar surfaces to preclude the bottoming of the cylindrical element on said horizontal surface.

6. The device of claim 3 wherein said means on the support member comprises a separate member, and means for fixing said separate member to said support member, whereby said planar surfaces may be formed with high accuracy in said separate member independently of the forming of the support member.

7. The device of claim 6 wherein said separate member is formed of sintered powdered metal.

8. The device of claim 3 wherein said means on the support member defines a plurality of pairs of converging planar surfaces, said pairs converging downwardly respectively toward a corresponding plurality of horizontal lines lying in a plurality of angularly related, preselected planes in which said axis lies.

9. In a radial saw, the combination comprising: an annular support member having a vertical axis; a cylindrical movable member having a lower end in the support member for rotative movement about said axis; annular means coaxially on the support member defining a first pair of planar surfaces converging downwardly toward a horizontal line lying in a preselected plane in which said axis also lies, and a second pair of planar surfaces converging downwardly toward said line and diametrically opposite said first pair; a cylindrical element on the movable member adjacent said lower end, having a horizontal axis extending perpendicular to said support member axis and projecting outwardly from diametrically opposite portions of said cylindrical element to engage centrally each of said first and second pairs of planar surfaces; and spring means for urging said cylindrical element downwardly against said surfaces to cause the cylindrical element to center itself removably accurately therebetween.

10. In a radial saw, the combination comprising: a support member having a vertical axis and provided with a first vertical channel defined by a pair of planar surfaces converging generally radially inwardly toward a first vertical line lying in a preselected plane in which said axis also lies; an arm having one end carried on the support member for movement about said axis and provided with a pair of clamping portions forming a second vertical channel defined by a pair of planar surfaces converging generally radially outwardly toward a second vertical line in said plane radially outwardly of said first vertical line, said first and second channels defining a vertical elongate space; a cylindrical element in said space having a vertical axis and engaging said planar surfaces of the first and second channels; and means for urging said clamping portions together to force the planar surfaces of said second channel against said cylindrical element and in turn said cylindrical element against the planar surfaces of said first channel causing the cylindrical element to center itself accurately therebetween and concurrently constricting the arm end about said support member and expanding said support member to secure the arm fixedly to the support member.

11. In a radial saw, the combination comprising: a support member having a vertical axis and provided with a first vertical channel defined by a pair of planar surfaces converging generally radially inwardly toward a first vertical line lying in a preselected plane in which said axis also lies; an arm having one end carried on the support member for movement about said axis and provided with a pair of clamping portions forming a second vertical channel defined by a pair of planar surfaces converging generally radially outwardly toward a second vertical line in said plane radially outwardly of said first vertical line, said first and second channels defining a vertical elongate space; a cylindrical element in said space having a vertical axis and engaging said planar surfaces of the first and second channels; means in said support member and connected to said cylindrical element, for adjusting the vertical position of the arm on the support member; and means for urging said clamping portions together when the arm is in a selected vertical position on the support member to force the planar surfaces of said second channel against said cylindrical element and in turn said cylindrical element against the planar surfaces of said first channel and cause the cylindrical element to center itself accurately therebetween.

12. In a radial saw, the combination comprising: a support; a column structure defining a vertical axis; first means for indexing the column in any one of a plurality of different angular positions relative to the longitudinal axis of the column, including means on the support defining accurately angularly spaced planar indexing surface portions adjacent the column; an arm; and second means for securing the arm to the column in any one of a plurality of positions longitudinally of the column and with the centerline of the arm extending in a vertical plane including the axis of the column and intersecting the cylinder defining the column in a single preselected line, including means on the arm defining accurate aligning planar surface portions adjacent the column, said first and second means further including a pair of cylindrical elements carried by the column structure, one element extending accurately perpendicular to said vertical axis and having its curved surface selectively tangentially engaging said surface portions on the support and the other element extending accurately parallel to said vertical axis and having its curved surface adjustably tangentially engaging said surface portions on the arm.

References Cited in the file of this patent

UNITED STATES PATENTS

| | | |
|---|---|---|
| 676,987 | Langbein | June 25, 1901 |
| 815,497 | Watson | Mar. 20, 1906 |
| 1,852,387 | Wieden | Apr. 5, 1932 |
| 1,867,275 | McCarter | July 12, 1932 |
| 1,956,835 | Roemer | May 1, 1934 |
| 2,323,608 | Kester | July 6, 1943 |
| 2,341,061 | Rhodes et al. | Feb. 8, 1944 |
| 2,432,245 | Lundquist | Dec. 9, 1947 |
| 2,513,497 | Langhlin | July 4, 1950 |
| 2,590,119 | Osterhus | Mar. 25, 1952 |
| 2,627,323 | Larson | Feb. 3, 1953 |
| 2,835,285 | Gardner | May 20, 1958 |